US010439457B1

(12) United States Patent
Garrison et al.

(10) Patent No.: US 10,439,457 B1
(45) Date of Patent: Oct. 8, 2019

(54) MAGNETIC INDUCTION DEFLECTOR APPARATUS AND METHOD

(71) Applicants: Roy Lee Garrison, Cantonment, FL (US); Charles Paul McNemar, Gulf Breeze, FL (US)

(72) Inventors: Roy Lee Garrison, Cantonment, FL (US); Charles Paul McNemar, Gulf Breeze, FL (US)

( * ) Notice: Subject to any disclaimer, the term of this patent is extended or adjusted under 35 U.S.C. 154(b) by 256 days.

(21) Appl. No.: 15/599,512

(22) Filed: May 19, 2017

Related U.S. Application Data

(60) Provisional application No. 62/338,696, filed on May 19, 2016.

(51) Int. Cl.
  *H02K 1/27* (2006.01)
  *H02N 2/18* (2006.01)
  *H01F 1/14* (2006.01)
  *H02K 53/00* (2006.01)

(52) U.S. Cl.
  CPC .............. *H02K 1/27* (2013.01); *H01F 1/14* (2013.01); *H02N 2/18* (2013.01); *H02K 53/00* (2013.01); *Y10S 74/09* (2013.01)

(58) Field of Classification Search
  CPC . H02K 1/27; H02K 53/00; H01F 1/14; H02N 2/18; Y10S 74/09
  See application file for complete search history.

(56) References Cited

U.S. PATENT DOCUMENTS

| 3,235,761 | A  | * | 2/1966 | Nohen | H02K 17/04 310/172 |
| 7,696,673 | B1 | * | 4/2010 | Yavid | F42C 11/02 310/329 |
| 2009/0134747 | A1 | * | 5/2009 | Reichmann | H02N 2/18 310/339 |
| 2013/0257208 | A1 | * | 10/2013 | Samuels | H02K 1/223 310/115 |

* cited by examiner

*Primary Examiner* — Mohamad A Musleh
(74) *Attorney, Agent, or Firm* — J. Nevin Shaffer, Jr.

(57) ABSTRACT

A magnetic induction deflector apparatus and method consisting of a metal wedge, where the metal wedge has a first side and a second side and the first side is connected with the second side at an angle such that the first side is angled away from the second side so as to form a metal wedge with a specific angle. A pair of solid wires are connected to the metal wedge where one wire is attached to the first side and another wire is attached to the second side. A second metal is connected to one side of the metal wedge and a device for connecting the second metal to the metal wedge is provided.

20 Claims, 3 Drawing Sheets

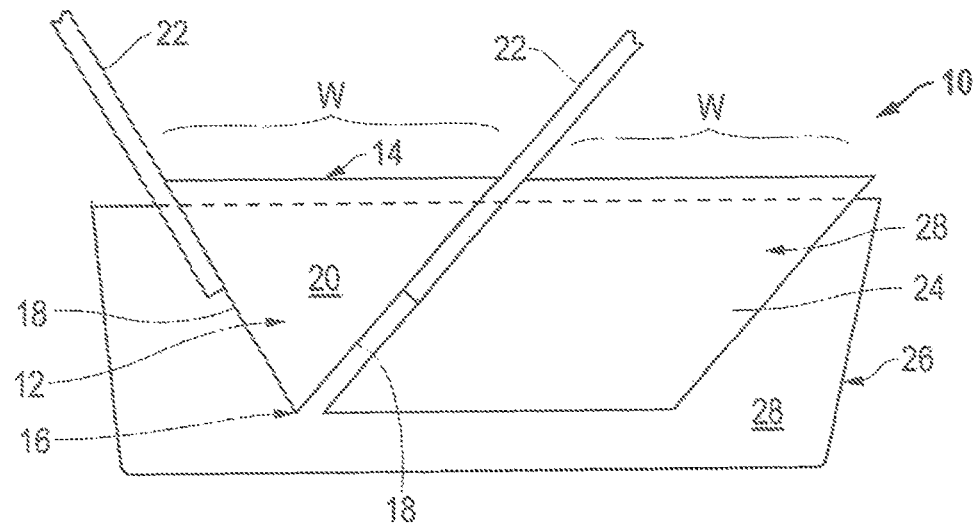
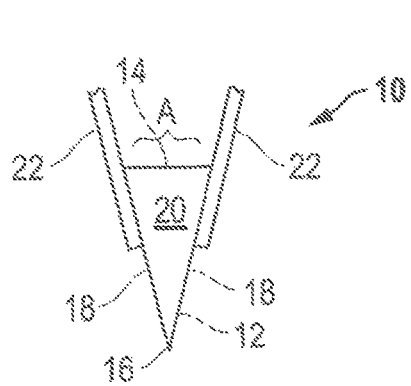
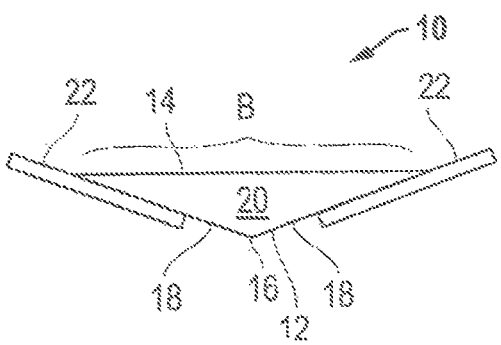
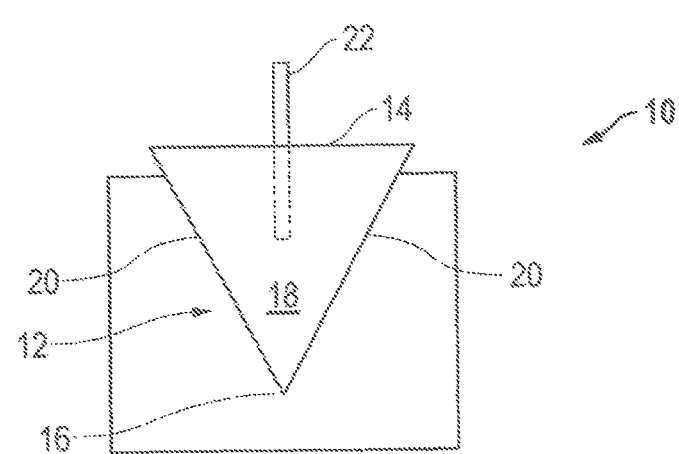

MAGNETIC INDUCTION DEFLECTOR APPARATUS AND METHOD

CROSS REFERENCE TO RELATED APPLICATION

This application claims the benefit of previously filed U.S. provisional patent application No. 62/338,696 filed May 19, 2016 for a "Magnetic Induction Deflector Apparatus and Method". The Applicant hereby claims the benefit of this provisional application under 35 U.S.C. § 119. The entire content of this provisional application is incorporated herein by this reference.

FIELD OF THE INVENTION

This invention relates to a magnetic induction deflector apparatus and method. In particular, in accordance with one embodiment, the invention relates to a magnetic induction deflector apparatus consisting of a metal wedge, where the metal wedge has a first side and a second side and the first side is connected with the second side at an angle such that the first side is angled away from the second side so as to form a wedge with a specific angle. A pair of solid wires are connected to the metal wedge where one wire is attached to the first side and another wire is attached to the second side. A second metal is connected to one side of the metal wedge and a device for connecting the second metal to the metal wedge is provided.

BACKGROUND OF THE INVENTION

A problem exists with regard to the use of magnet repulsion motors, for example only and not by way of limitation, in that the magnets of such devices naturally attempt to align. This is a severe problem that has hampered the effectiveness and efficiency of such motors since their development. This problem results in grid power transmission line loss from resistance due to transformer and electro magnetic motor induction reactions Thus, there is a need in the art for a device that diminishes and/or deflects the natural forces of magnetic alignment and beneficially uses that diminishment to enhance the effectiveness of such motors.

It therefore is an object of this invention to provide a device for the deflection of magnetic forces that is useful with commercial power grid systems and any and all magnet repulsion motors, again, for example only, that is non-complex in assembly, and that is configurable to produce a range of electrical resistance energy recovery effects as a result of interaction with power transformers and the redirection of the magnetic mechanical alignment force resistance common to electric motors and magnetic repulsion motor design.

SUMMARY OF THE INVENTION

Accordingly, the magnetic induction deflector apparatus of the present invention, according to one embodiment, includes a metal wedge where the metal wedge has a first side and a second side and the first side is connected with the second side at an angle such that the first side is angled away from the second side so as to form a wedge with a specific angle. Each selected angle has its own deflection effect such that varying the angle allows the user to create a device with a specific magnetic current propagation angle. A pair of wires are connected to the metal wedge where one wire is attached to the first side and another wire is attached to the second side. A second metal is connected with one side of the metal wedge and a device for connecting the second metal with the metal wedge is provided.

All terms used herein are given there common meaning such that "wedge" describes an object thick at one end and narrow at the other end, like a wedge for splitting logs, for example. Thus in the present invention the metal wedge is "thickest" or widest at the top, for example, and thin or narrow at the bottom, as is shown in the figures. As a result, attaching the metal wires, one metal wire on one side and one metal wire on the other side, results in the two wires mimicking and/or mirroring the wedge shape of the metal wedge.

Likewise, the term "second metal" describes a metal that is not the metal of the metal wedge but a separate, different metal.

Further, "a device for connecting the second metal with the metal wedge" describes any device for connecting one metal with another as are now known or hereafter developed including welding or soldering, wire wraps or encapsulating them in material such as the piezoelectric material described more fully herein.

Thus in one aspect, the device for connecting the two metals is a piezoelectric material where the piezoelectric material is configured to at least partially surround the metal wedge.

According to another aspect, the metal wedge is an iron wedge.

In another aspect, the pair of wires are silver plated wires. In a further aspect, the silver plate is at least fifteen percent silver.

In one aspect, the angle of the metal wedge is selected from a range of angles from one degree to three hundred and fifty nine degrees.

In a further aspect, the second metal is bismuth.

In another aspect, the second metal is as thick as the metal wedge at the thickest part of the metal wedge.

In one aspect, the metal wedge includes a top and a bottom and two oppositely positioned edges where the two edges are connected at the bottom and spaced apart in connection with the top such that the metal wedge is a triangle form.

According to another embodiment, a magnetic induction deflector apparatus consists of a metal wedge where the metal wedge has a first side and a second side, the first side connected with the second side at an angle such that the first side is angled away from the second side so as to form a wedge with a specific angle and where the metal wedge includes a top and a bottom and two oppositely positioned edges where the two edges are connected at the bottom and spaced apart in connection with the top such that the metal wedge is a triangle form. A pair of wires are connected to the metal wedge where one wire is attached to the first side and another wire is attached to the second side where the attachment of the wires to the sides is such that the wires assume the angle of the sides to which they are attached. A second metal is connected with one side of the metal wedge and a device for connecting the second metal with the metal wedge is provided where the device for connecting the second metal with the metal wedge is a piezoelectric material where the piezoelectric material is configured to at least partially surround the metal wedge and the second metal.

In one aspect, the metal wedge is an iron wedge.

In another aspect, the pair of wires are silver plated wires and in a further aspect, the silver plate is at least fifteen percent silver.

In one aspect, the angle of the metal wedge is selected from a range of angles from one degree to three hundred and fifty nine degrees.

In one aspect, the second metal is bismuth and in another aspect, the second metal is as thick as the metal wedge at the thickest part of the metal wedge.

According to another embodiment, a magnetic induction deflector method consists of: a. providing a metal wedge where the metal wedge has a first side and a second side, the first side connected with the second side at an angle such that the first side is angled away from the second side so as to form a wedge with a specific angle; a pair of wires connected to the metal wedge where one wire is attached to the first side and another wire is attached to the second side; a second metal connected with one side of the metal wedge; and a device for connecting the second metal with the metal wedge; and b. connecting the second metal with the metal wedge.

In one aspect, the device for connecting the second metal with the metal wedge is a piezoelectric material where the piezoelectric material is configured to at least partially surround the metal wedge and the second metal.

In another aspect, the metal wedge is an iron metal wedge and the second metal is bismuth.

In a further aspect, the method further consists of providing a repulsion magnetic motor with a pair of rotors with rotating magnets and placing the metal wedge between the pair of rotors.

DESCRIPTION OF THE DRAWINGS

Other objects, features and advantages of the present invention will become more fully apparent from the following detailed description of the preferred embodiment, the appended claims and the accompanying drawings in which:

FIG. 1 is a side view of the magnetic induction deflector of the present invention;

FIG. 2 is a side view of the invention of FIG. 1 showing a small wedge angle A;

FIG. 3 is a side view of the invention of FIG. 1 showing a large wedge angle B;

FIG. 4 is a front view of the invention of FIG. 1 showing the edges meeting at the bottom and spaced apart at the top such that the wedge is a triangle shape;

DETAILED DESCRIPTION OF THE INVENTION

Figure 5:
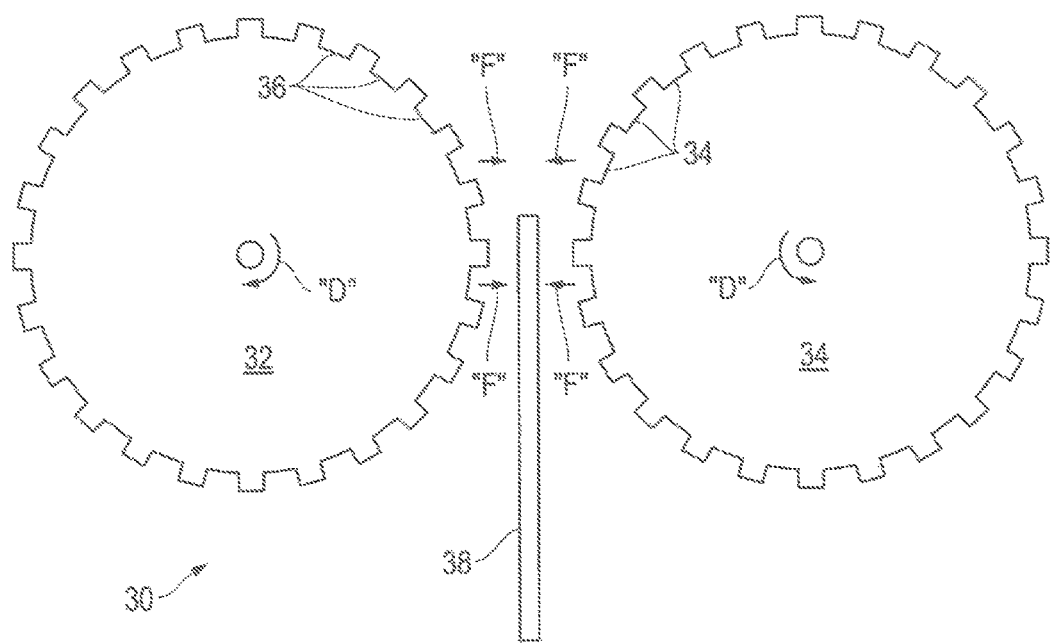
FIG. 5 is a Prior Art illustration of the force lines found in a typical repulsion magnetic motor with a pair of rotors with rotating magnets.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

It should also be noted that a plurality of hardware devices, as well as a plurality of different structural components, may be utilized to implement the invention. Furthermore, and as described in subsequent paragraphs, the specific configurations illustrated in the drawings are intended to exemplify embodiments of the invention and that other alternative configurations are possible.

The preferred embodiment of the present invention is illustrated by way of example in FIGS. 1-4 and 6. With specific reference to FIGS. 1, 2 and 3, a magnetic induction defector apparatus 10 includes, according to a preferred embodiment, a metal wedge 12. Metal wedge 12 has a top 14, bottom 16, and two sides 18. As shown in FIG. 4, metal wedge 12 also includes two edges 20.

Metal wedge 12 is preferably made of high quality iron with the two sides connected at an angle as shown in the figures such that a "wedge" shape is formed with the sides 18 connected at the bottom 16 and spaced apart to form a wide, thick top 14 with a thickness or width "W". The connection of the sides 18 may create any specific angle deemed useful so as to achieve the desired deflection effect for the particular application, as will be discussed more fully hereafter.

FIG. 2 illustrates a thin wedge with a small thickness or width "A" and FIG. 3 illustrates a thick wedge with a large thickness or width "B". Any sized wedge width deemed suitable for the situation is included in the scope of the invention, including angles of one to three hundred fifty-nine.

FIGS. 1-3 also illustrate a pair of wires 22 connected to metal wedge 12, one wire 22 connected to one side 18 and one wire 22 connected to the other side 18. Preferably the wires are silver plated and, again preferably, the silver plate is at least fifteen percent silver.

FIGS. 1-3 illustrate that preferably, wires 22 are connected with the sides 18 such that a length of wire 22 runs parallel to the side 18 to which it is attached. This results in the wires assuming the angle of the wedge, whatever thickness or width, when the wire extends beyond the top 14 of metal wedge 12, all as illustrated.

FIG. 1 also illustrates second metal 24 connected to only one side 18 of metal wedge 12. In a preferred embodiment, second metal 24 is Bismuth. In another preferred embodiment, second metal 24 has a width "W" that is the same as the width "W" of the metal wedge 12 at the thickest point.

Thus, as FIG. 1 shows, second metal 24 has a width "W" that is the same as the width "W" of the metal wedge 12 at its widest point. Second metal 24, however, preferably maintains the same width "W" throughout, also as shown in FIG. 1.

Still referring to FIG. 1, a connecting device 26 for connecting second metal 24 to metal wedge 12 is shown partially in dotted lines for clarity. Connecting device 26 may be any device now known or hereafter developed. In fact second metal 24 may be welded or glued to metal wedge 12. Preferably, though, connecting device 26 is a piezoelectric material 28, as described more fully herein, where the piezoelectric material 28 is configured to at least partially surround the metal wedge 12 and the second metal 24, as illustrated. FIGS. 2 and 3 do not show second metal 24 or connecting device 26 for clarity.

Referring to FIG. 4, according to another preferred embodiment, metal wedge 12 includes a top 14 and a bottom 16 and two oppositely positioned edges 20 where the two edges 20 are connected at the bottom 16 and spaced apart in connection with the top 14 such that the metal wedge 12 is a triangle form. That is, metal wedge 12 is wedge shaped as shown in FIGS. 1-3 and, in this embodiment, also triangularly shaped as shown in FIG. 4.

Figure 6:
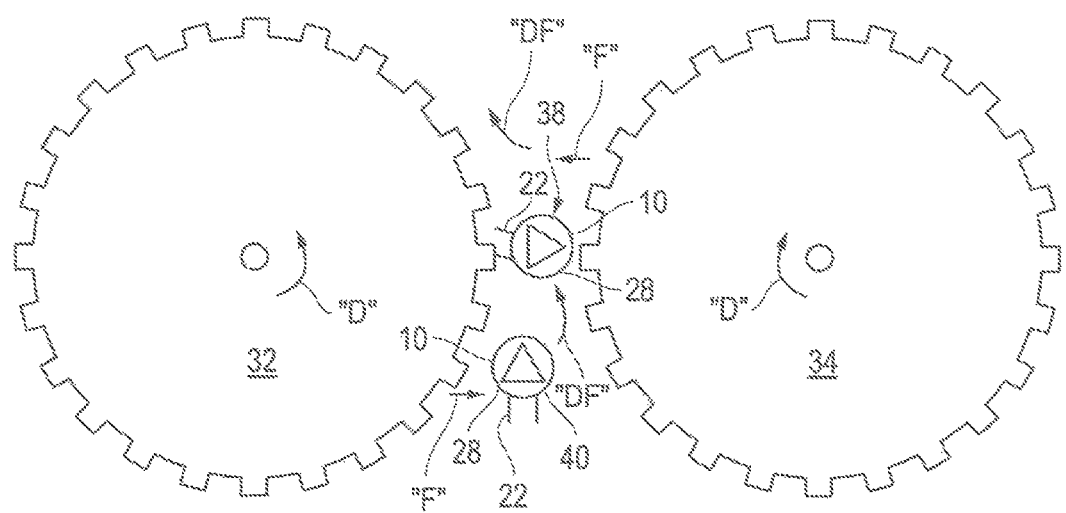
FIG. 6 illustrates the deflection effect and voltage produced in accordance with the invention of FIG. 1 when located between the pair of rotating magnets of FIG. 5.

Referring now to FIG. 5, a schematic illustration of a Prior Art repulsion magnetic motor 30 with a pair of rotors 32 and 34 with rotating magnets 36 is shown. Direction arrows "D" show the direction of the two rotors 32 and 34. Force arrows "F" show the typical, problematical force lines that occur in the presence of an iron bar 38. FIG. 6 shows the same elements as in FIG. 5 but with the direction of rotation of the pair of rotors 32 and 34 reversed. FIG. 6 shows the effect of magnetic induction deflector 10 when placed in between rotors 32 and 34.

In the first location, 38, magnetic induction deflector 10 causes the normal force "F" to deflect "DF" such the it is directed more in the direction of rotation "D" of rotor 32.

In the second location 40, shown in FIG. 6, magnetic induction deflector 10 causes the normal force "F" to deflect "DF" such the it is directed more in the direction of rotation "D" of rotor 34.

Still further, no matter the location, when magnetic induction deflector 10 is located between a pair of rotors with rotating magnets, voltage charge is produced and channeled to wires 22 in the conversion of magnetic field forces by the piezoelectric material 28 when present.

By way of further description, in a preferred embodiment the invention is four major parts: a piezoelectric crystal, a metal wedge, a second metal attached to the metal wedge and two silver plated solid wires. The wires are attached to the wedge and angled apart in accordance with the shape of the wedge. That is the wires align with the angled sides and thus assume the angles of the sides, The combination then is surrounded by or inserted within the crystal.

When placed in between rotating magnets, the magnets react with the present invention and create an electrical charge that is transferred through the wires which provide usable electrical currents for charging battery power. Further, the geometric shape and position of the present invention and its mass produces the magnetic flux deflection that prevents the magnetic force lines from aligning. By placement of the present invention between the normal straight line flus magnetic resistance, the present invention serves to redirect the magnetic force lines into the angle of desired rotation, or current flow, absent the resistance normally produced by typical magnetic field resistance without the present invention. Further, opposition stress forces inside the piezoelectric crystal produce an electric charge in the bi pole electrical conditions of the crystal materials and thereby into the iron wedge and attached silver plated conductors. Silver welding metallurgy may be necessary in order to attach the wires to the iron properly.

Applicants have determined by testing that the shape and mass of the iron wedge deflects the magnetic alignment of the rotors in a repulsion magnet motor. The amount of deflection is adjustable by varying the degree of the wedge angle and its physical mass and size.

The process of forming the crystal is a generally known process. However, Applicants have identified as new to have nana particle silver added to the crystal formula.

Further, Applicants have determined that the type of metal for the metal wedge is important. The preferred embodiment is an iron wedge of high quality and very low carbon and the preferred second metal is Bismuth with 999.9% purity.

Additionally, the Applicants have determined that the silver plating of at least 15% on the wires is preferable although it can be higher as that has been determined to be of use for welding and for better strength.

Further, in summary, Applicants have developed and manufactured and combined three new and very different electronic components that function as a improved control device specifically for direction of magnetic fields and performance enhancement aid for repulsion magnetic motors, for example only. The present invention when assembled results in a small part that specifically by design redirects the centerline of opposing magnetic fields where otherwise mechanical gear timing and alignment are required in order to prevent magnets from centering two magnetic forces. The present invention advances repulsion sciences configured as beyond combustion motors beyond the need for gears and conventional field coil wires for electrical current generation and magnetic field direction control.

The materials to form or mold a batch of Piezoelectric crystals may be purchased at food stores and health food stores and the metals used for the sedges and wire conductors from metal supply vendors by ordering online shopping, as is known.

The formula for the crystal is a cooking process of ingredients involving (a.) cream of tartar mixed carefully to a saturation point (b.) inside a hot water bath at 180 degrees, then (c.) at saturation of amounts (for example: one cup of 1500 ppm Nana particle silver water) (d.) as the water being mixed with 4 ounces of cream of tartar, (e.) a critical sensitive step of the synthetic cooking process adds tiny amounts (example ¼ teaspoon) amounts of soda ash (f.) for a chemical reaction during each additional spoon (g.) until the chemical reaction suddenly stops and the liquid turns clear.

At this point (h.) the hot thick clear liquid is ready for final filtration and pouring into plastic or metal molds for the desired shape and iron wedge configuration of the MID component part. After three or four days in a cool place the synthetic piezoelectric crystals will harden to form the electric dipole matrix needed for the Piezoelectric crystal to perform as a di-pole.

Collectively the inventors have 40 years of amateur radio and formal education in several areas requiring understanding in solid state electronics and their design. The testing has been with application of the present invention component to magnetic motors where the present invention is needed in order to tune and better control the process. The inventors have professional electronic instrument visuals and are able to perform testing by way of the oscilloscope equipment so as to be able to produce magnetic fields and test various wave form deflection and deflection patterns produced by the present invention.

Again, the Applicants have determined, that the particular size of the present invention is relevant to the effect it has on the mass and magnetic field strength of the repulsion parts.

The parts of the invention as shown in the Figures, show what a semi round device the component looks like geometrically which is very similar to a typical electronic component only much larger as the present invention is a electronic invention design for macro or large scale electronics.

In radiation theory, the electric dipole moment happens to atoms when a strong incident field absorbs forces or energy and such is the case with piezoelectric crystals and magnetic forces that become stressed with electrical and physical force inside the encapsulation of the invention. This means the crystalline structure of the invention has capability to "suck up" electromagnetic energy from a spatial region (that is) also effected. The present invention exploits an iron, tapered wedge able to unbalance the magnetic conductive mass at varying angles.

The key to the physical sciences involved are that the target area of the fields lines are altered by the magnetic induction deflector of the present invention by the paramagnetic layer of the second metal, preferably Bismuth, which cross sectional area becomes directly involved in deflecting the magnetic fields away from rotational force cancelling alignment due to the physical slope design of the metal wedge.

Where, magnetic forces place stress and relate to the varying position and density of the internal iron wedge these field lines stress the crystal Piezoelectric atoms at varying frequencies and in turn modulate an electrical charge effect.

Deflection angles created by the invention are in relationship to the fields and the energy flux field which then "funnels" the magnetic forces of repulsion magnet motors into a control magnetic field. The inventors vision for this invention has created a new electronic component to attract and form diffraction patterns of magnet flux at varying angles depending on the manufactured specifications of the device of the present invention as a part for internal angle placement of the iron part and the mounted physical attachment of the invention itself.

Calculations used include:

$r=nN(2)=Mv/qB$–Radius of path produced by magnetic field.

Thus, if the velocity, v, is produced by an accelerating voltage:

$½nN(2)=qv$; $v$=the square root of $2qv/M$ and substitution gives:

$r=1/B$ times the square root of $2Mv/q$.

The present invention cancels the direct path produced by the magnetic field by producing a radius path. The present invention, in one embodiment, also produces voltage resulting from a passing magnetic field entering the mid deflection zone that produces a force on the piezoelectric material which in turn is conducted in to the metal wedge and its attached wires produced by deflection of a magnetic field and resulting in voltage and filed direction changes that absent the present inventions would be straight and resistive forces.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. A magnetic induction deflector apparatus comprising:
   a. a metal wedge wherein said metal wedge has a first side and a second side, said first side connected with said second side at an angle such that said first side is angled away from the second side so as to form a metal wedge with a specific angle;
   b. a pair of wires connected to said metal wedge wherein one wire is attached to said first side and another wire is attached to said second side;
   c. a second metal connected with one side of said metal wedge; and
   d. a means for connecting said second metal with said metal wedge.

2. The apparatus of claim 1 wherein said means for connecting said second metal with said metal wedge is a piezoelectric material wherein said piezoelectric material is configured to at least partially surround said metal wedge and said second metal.

3. The apparatus of claim 1 wherein said metal wedge is an iron wedge.

4. The apparatus of claim 1 wherein said pair of wires are silver plated wires.

5. The apparatus of claim 4 wherein said silver plate is at least fifteen percent silver.

6. The apparatus of claim 1 wherein said angle of said metal wedge is selected from a range of angles from one degree to three hundred and fifty nine degrees.

7. The apparatus of claim 1 wherein said second metal is bismuth.

8. The apparatus of claim 1 wherein said second metal is as thick as said metal wedge at the thickest part of said metal wedge.

9. The apparatus of claim 1 wherein said metal wedge includes a top and a bottom and two oppositely positioned edges wherein the two edges are connected at the bottom and spaced apart in connection with said top such that said metal wedge is a triangle form.

10. A magnetic induction deflector apparatus comprising:
   a. a metal wedge wherein said metal wedge has a first side and a second side, said first side connected with said second side at an angle such that said first side is angled away from the second side so as to form a metal wedge with a specific angle and wherein said metal wedge includes a top and a bottom and two oppositely positioned edges wherein the two edges are connected at the bottom and spaced apart in connection with said top such that said metal wedge is a triangle form;
   b. a pair of wires connected to said metal wedge wherein one wire is attached to said first side and another wire is attached to said second side wherein the attachment of said wires to said sides is such that the wires assume the angle of the sides to which they are attached;
   c. a second metal connected with one side of said metal wedge; and
   d. a means for connecting said second metal with said metal wedge wherein said means for connecting said second metal with said metal wedge is a piezoelectric material wherein said piezoelectric material is configured to at least partially surround said metal wedge and said second metal.

11. The apparatus of claim 10 wherein said metal wedge is an iron wedge.

12. The apparatus of claim 10 wherein said pair of wires are silver plated wires.

13. The apparatus of claim 12 wherein said silver plate is at least fifteen percent silver.

14. The apparatus of claim 10 wherein said angle of said metal wedge is selected from a range of angles from one degree to three hundred and fifty nine degrees.

15. The apparatus of claim 10 wherein said second metal is bismuth.

16. The apparatus of claim 10 wherein said second metal is as thick as said metal wedge at the thickest part of said metal wedge.

17. A magnetic induction deflector method comprising:
 a. providing a metal wedge wherein said metal wedge has a first side and a second side said first side connected with said second side at an angle such that said first side is angled away from the second side so as to form a metal wedge with a specific angle; a pair of wires connected to said metal wedge wherein one wire is attached to said first side and another wire is attached to said second side; a second metal connected with one side of said metal wedge; and a means for connecting said second metal with said metal wedge; and
 b. connecting said second metal with said metal wedge.

18. The method of claim 17 wherein said means for connecting said second metal with said metal wedge is a piezoelectric material wherein said piezoelectric material is configured to at least partially surround said metal wedge and said second metal.

19. The method of claim 17 wherein said metal wedge is an iron metal wedge and wherein said second metal is bismuth.

20. The method of claim 17 further comprising:
 a. providing a repulsion magnetic motor with a pair of rotors with rotating magnets; and
 b. placing said metal wedge between said pair of rotors.

\* \* \* \* \*